(12) United States Patent
Chen (10) Patent No.: US 6,322,283 B1
(45) Date of Patent: Nov. 27, 2001

(54) CONNECTION STRUCTURE FOR A HEAD TUBE AND A HANDLE SECURING ROD OF A BICYCLE

(76) Inventor: Yung Hsiung Chen, P.O. Box 82-144, Taipei (TW)

(*) Notice: Subject to any disclaimer, the term of this patent is extended or adjusted under 35 U.S.C. 154(b) by 0 days.

(21) Appl. No.: 09/537,759

(22) Filed: Mar. 30, 2000

(51) Int. Cl.[7] ............... B25G 3/00; F16B 3/00; F16D 1/00
(52) U.S. Cl. ............ 403/345; 280/279; 74/551.1
(58) Field of Search ............... 403/345, 359.1; 280/279, 280; 74/551.1

(56) References Cited

U.S. PATENT DOCUMENTS

| | | | |
|---|---|---|---|
| 5,201,242 | * 4/1993 | Chi | 74/551.1 |
| 5,209,138 | * 5/1993 | Shu | 74/551.2 |
| 5,492,033 | * 2/1996 | Hopey | 74/551.1 |
| 5,782,479 | * 7/1998 | Adams et al. | 280/279 |
| 5,810,380 | * 9/1998 | Lin | 280/279 |
| 5,924,714 | * 7/1999 | Farris et al. | 280/276 |
| 6,145,637 | * 11/2000 | Hopey | 188/306 |

* cited by examiner

Primary Examiner—Lynne H. Browne
Assistant Examiner—John B Walsh
(74) Attorney, Agent, or Firm—A & J (57) ABSTRACT

A connection structure for a head tube and a handle securing rod of a bicycle, characterized in that a connection block is secured at a jacket within the head tube, and the center of the connection block is provided with a screw hole, and the head tube is mounted to the connection ring tube of the handle securing rod for the mounting of a securing element to the screw hole of the connection block, and the head tube and the handle securing rod are joined to form as a unit.

1 Claim, 9 Drawing Sheets

PRIOR ART

FIG. 1

PRIOR ART

FIG. 2

PRIOR ART

FIG. 3

PRIOR ART

CONNECTION STRUCTURE FOR A HEAD TUBE AND A HANDLE SECURING ROD OF A BICYCLE

BACKGROUND OF THE INVENTION

1. a) Technical Field of the Invention

The present invention relates to a connection structure for a head tube and a handle securing rod of a bicycle, characterized in that a connection block is secured at a jacket within the head tube, and the center of the connection block is provided with a screw hole, and the head tube is mounted to the connection ring tube of the handle securing rod for the mounting of a securing element to the screw hole of the connection block, and the head tube and the handle securing rod are joined to form as a unit. This will avoid damage caused by friction at the inner wall of the head tube.

2. b) Description of the Prior Art

Figure 1:
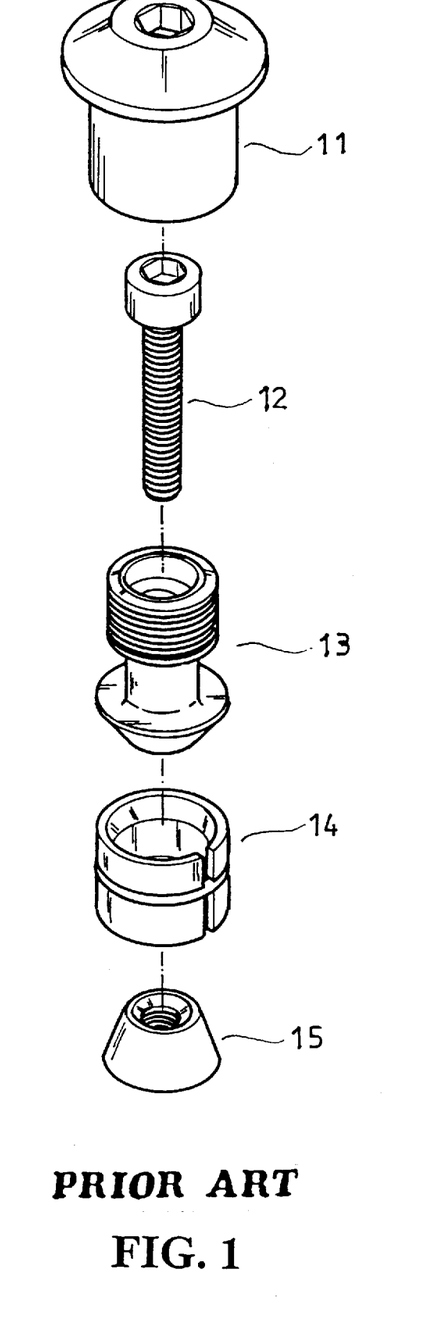
FIG. 1 is an exploded perspective view of a conventional securing element.
Figure 2:
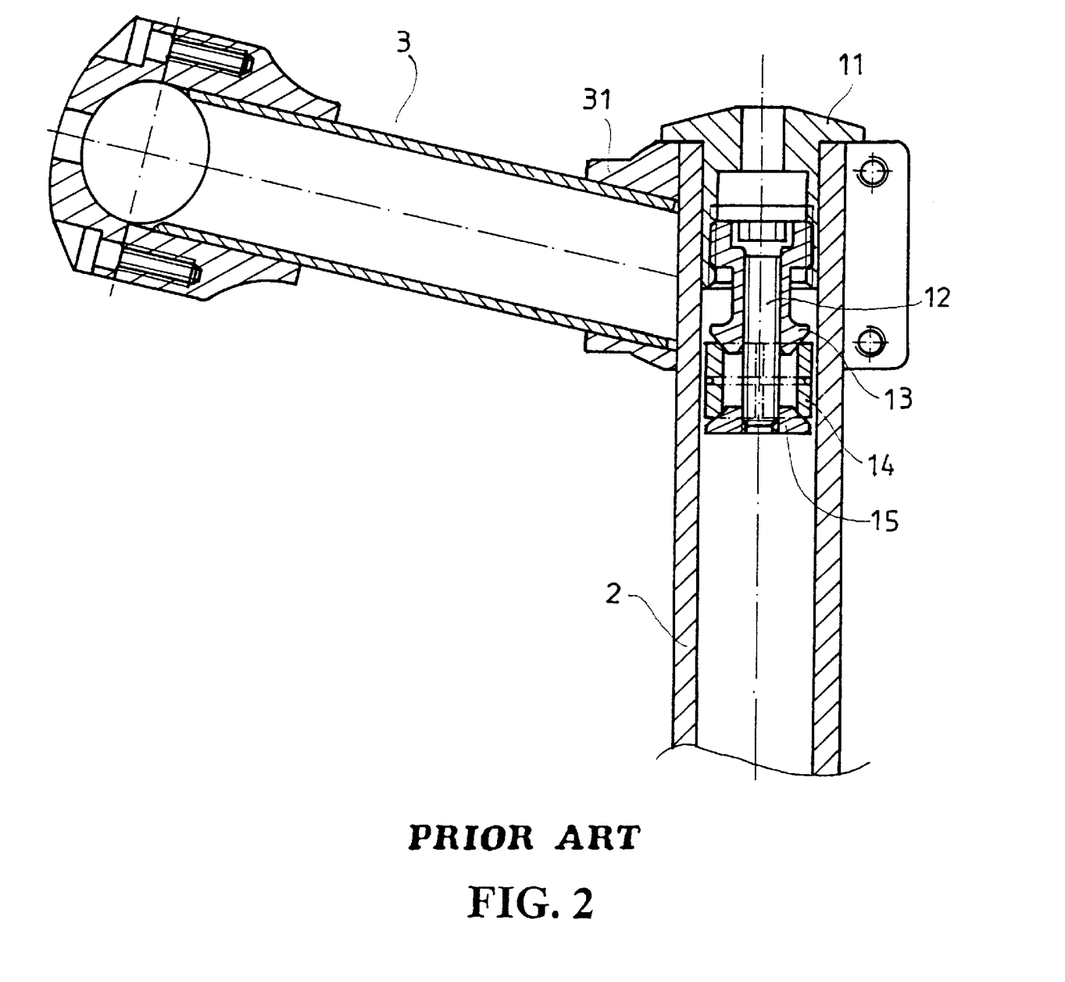
FIG. 2 is a schematic view showing the insertion of the securing element of FIG. 1.
Figure 3:
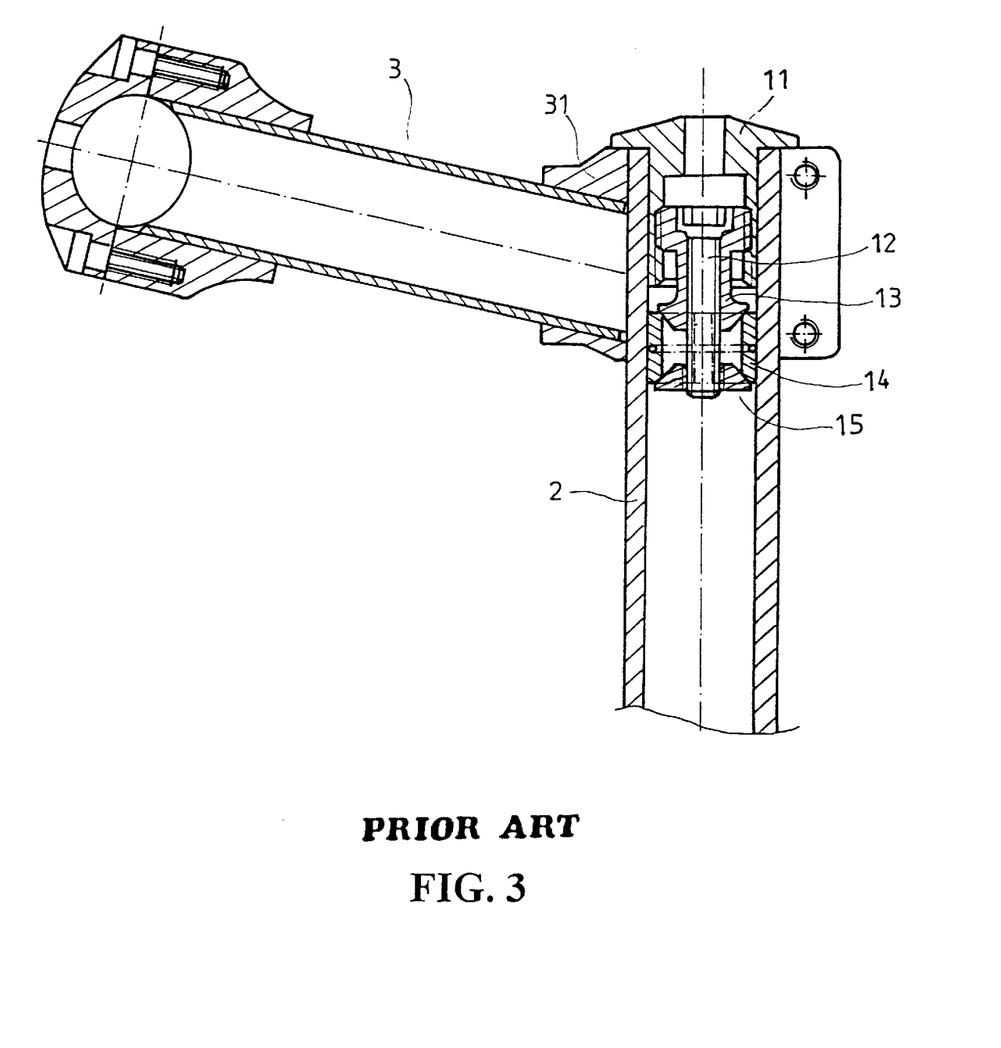
FIG. 3 is a schematic view of the securing element of FIG. 1 after mounting.
Figure 4:
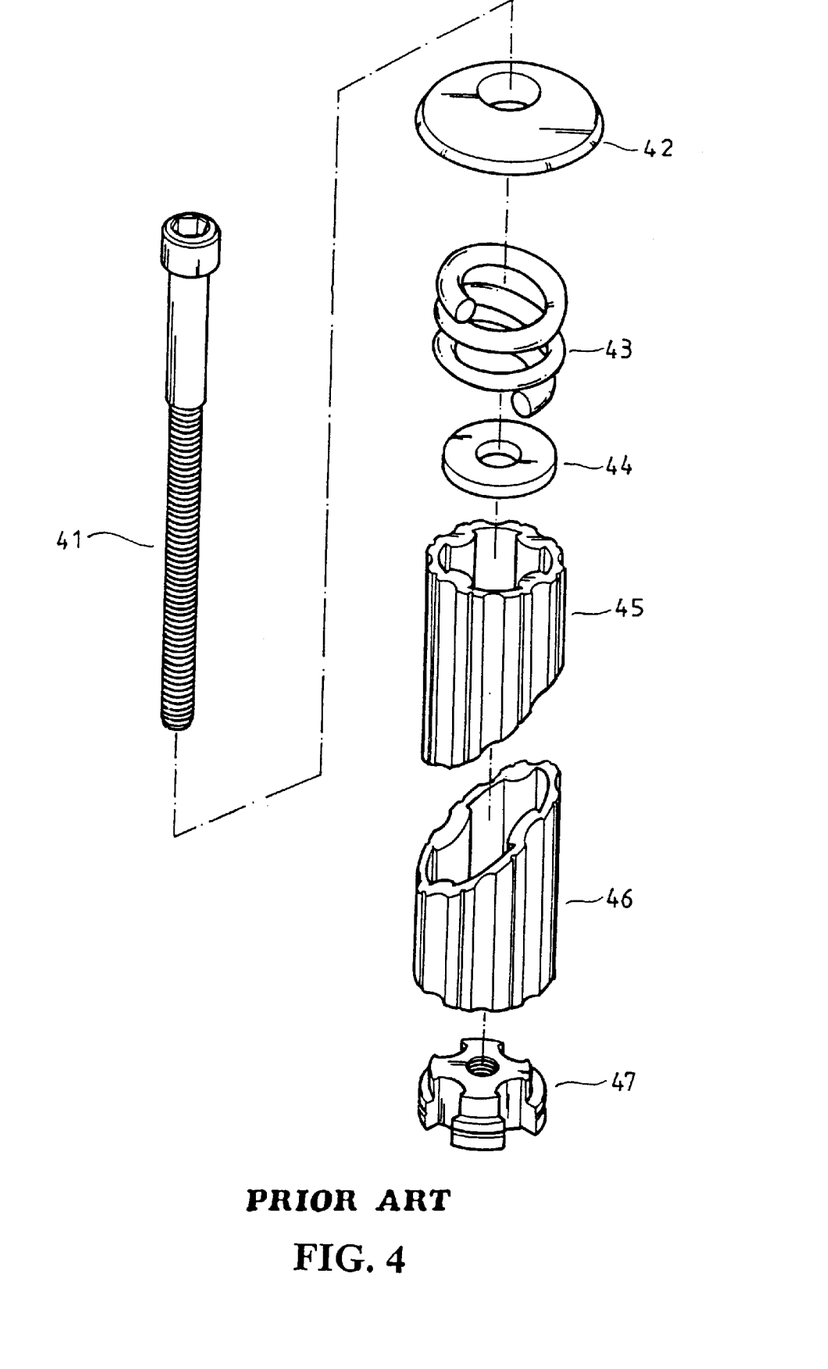
FIG. 4 is an exploded perspective view of another conventional securing element.
Figure 5:
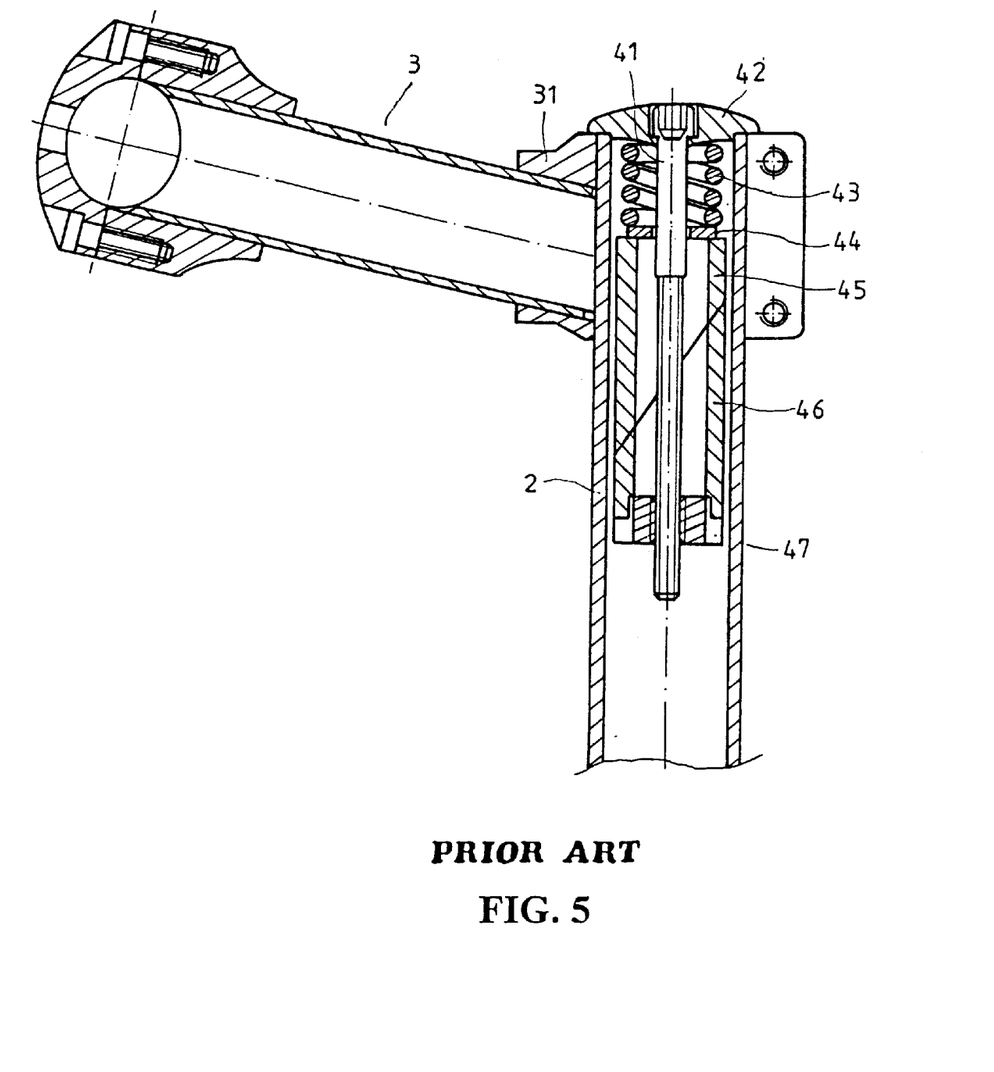
FIG. 5 is a schematic view showing the insertion of the securing element of FIG. 4.
Figure 6:
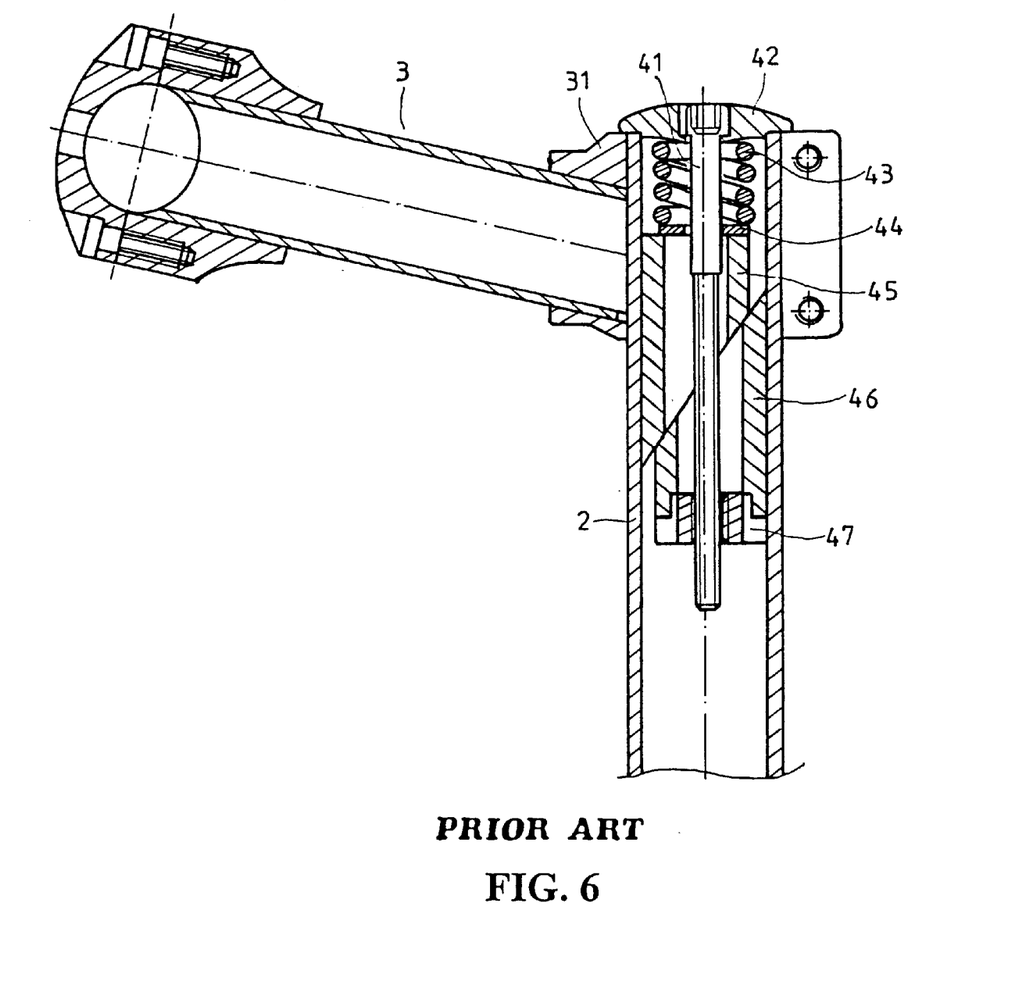
FIG. 6 is a schematic view of the securing element of FIG. 4 after mounting.

As shown in FIG. 1, a conventional securing element 1 includes a nut head 11, a screw rod 12, a top block 13, an extension ring 14 and an urging block 15. The bottom side of the top block 13 is an inverted conic shaped ring body. After the screw rod 12 has inserted into the center hole of the top block 13, the top circumferential face of the top block 13 is then screwed at the center hole. The bottom end of the screw rod 12 is an extension from the lower section of the top block 13. The center hole of the extension ring 14 is located near to the conic ring body of the bottom end of the top block 13. The screw rod 12 passes through the top block 13 and the extension ring 14 and is secured at the urging block 15. FIG. 3 shows the mounting of the head tube 2 and the handle securing rod 3 to form as a unit. In this case, the extension from the extension ring 14 causes the head tube 2 and the handle securing rod 3 to mount together so that the end head of the securing rod 3 can be easily provided with a handle. FIG. 4 is another type of conventional securing element 4 including a screw rod 41, a nut ring 42, a spring 43, a pad 44, a ring tube 45, a bottom ring tube 46 and a screw body 47. The circumferential face of the top ring tube 45 has a recessed shape and that of the bottom ring tube 46 is protruded, and the corresponding ends of the two ring tubes 45, 46 have a sloping shape. The screw rod 41 passes through the nut ring 42, the spring 43, the pad 44, the top ring tube 45 and the bottom ring tube 46 in sequence, and then is secured at the screw body 47 to form as a unit. In application, as shown in FIG. 5, when the screw rod 41 rotates, the screw body 47 rotates upward and a pushing force is exerted onto the top ring tube 45 and the bottom ring tube 46. This will cause the corresponding ends to extend radially and the circumferential face urges the tube wall of the head tube 2. As shown in FIG. 6, the end head of the handle-bar securing rod 3 is mounted with the handle.

The drawback of the conventional securing element 1 by means of the radially extended securing element is that the vibration caused by a bumpy road is concentrated at the head tube of the bicycle. The stress thus formed will break the securing element 1 and the tube wall, and the securng effect is inefficient. In some cases, the handle securing rod 3 may be dislocated from the head tube.

SUMMARY OF THE INVENTION

Accordingly, it is an object of the present invention to provide a connection structure for a head tube and a handle securing rod of a bicycle, characterized in that a connection block is secured at a jacket within the head tube, the center of the connection block is provided with a screw hole, and the head tube is mounted to the connection ring tube of the handle securing rod for the mounting of a securing element to the screw hole of the connection block, and the head tube and the handle securing rod are joined to form as a unit Yet another object of the present invention is to provide a connection structure for a head tube and a handle securing rod of a bicycle, wherein the dislocation of the handle secuing rod from the head tube can be prevented.

Another object of the present invention is to provide a connection structure for a head tube and a handle securing rod of a bicycle, wherein the strength of the head tube is improved.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 7:
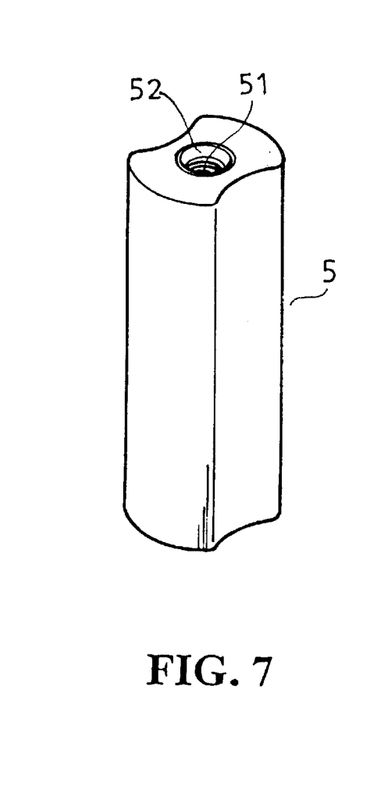
FIG. 7 is a perspective view of a preferred embodiment of the present invention
Figure 8:
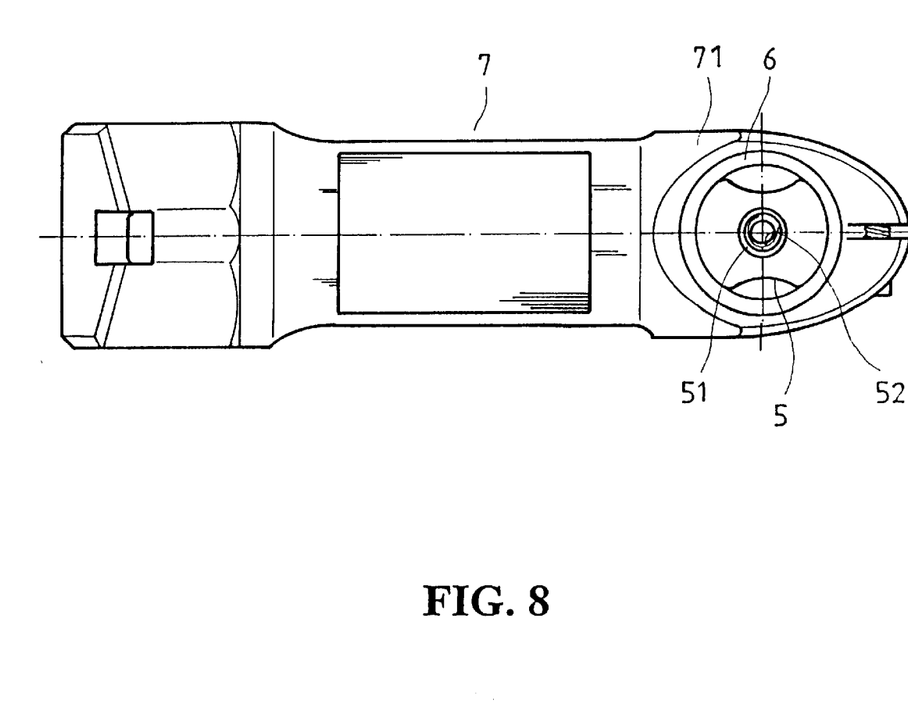
FIG. 8 is a top view, showing the head tube being inserted, of the present invention.

Referring to FIGS. 7 and 8, the present connection structure has a connection block 5 mounted within a head tube 6 to secure a handle securing rod 7. The connection block 5 has two protruded circular arcs at two corresponding sides, and two recessed circular arcs. The largest external diameter of the block 5 is equivalent to that of the hole of the head tube 6. The center of the connection block 5 is provided with a screw hole 51, and the top side of the screw hole 51 has a conic face for the insertion of the securing element. In accordance with the present invention, the connection block 5 has a circumferential face made of fiber material and an aluminum alloy is provided to the center thereof. Thus, the screw hole 51 can be provided at the center aluminum alloy material. However, the entire connection block 5 can be made from a low specific gravity alloy material formed to form as one unit. The circumferential face can be other trigonometrical shapes than the circular arc face such that the connection block 5 can contact with the center hole of the head tube 6. After inserting the connection block 5 (coated with an adhesive) into the center hole of the head tube 6, the two components are adhered to each other and formed integrally as one unit.

Figure 9:
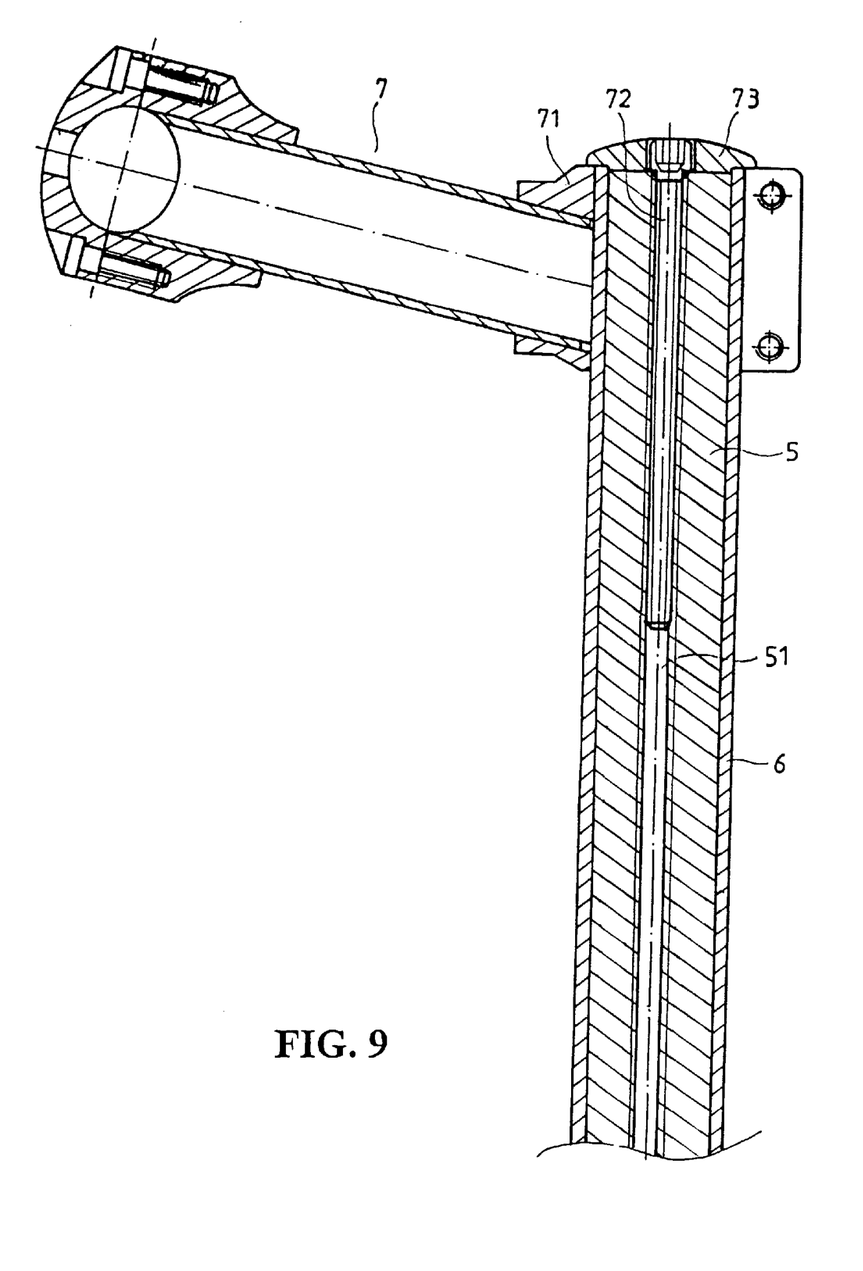
FIG. 9 is a schematic view showing the mounting of the present invention.

Referring to FIG. 9, the top end of the head tube 6 passes through the hole of the connection ring tube 71 of the handle securing rod 7 and then mounted to the screw hole 51 of the connection block 5 after passing through a securing element 72 and a pad 73. The head tube 6 and the handle secuing rod 7 are mutually mounted to each other. As the connection block 5 is formed integrally with the head tube 6 as one unit, when vibration of the bicycle is translated to the head tube 6, stress is not concentrated at the head tube, and there is no friction occurred at the tube wall of the head tube 6. Thus, the effectiveness of securing force of the head tube 6 is maintained and the mounting condition is stable. As shown in FIG. 8, the connection block 5 can be a reinforcing rib to the head tube 6 so as to increase the strength of the head tube 6. Thus, the breaking of the head tube 6 as a result of stress is avoided.

Figure 10:
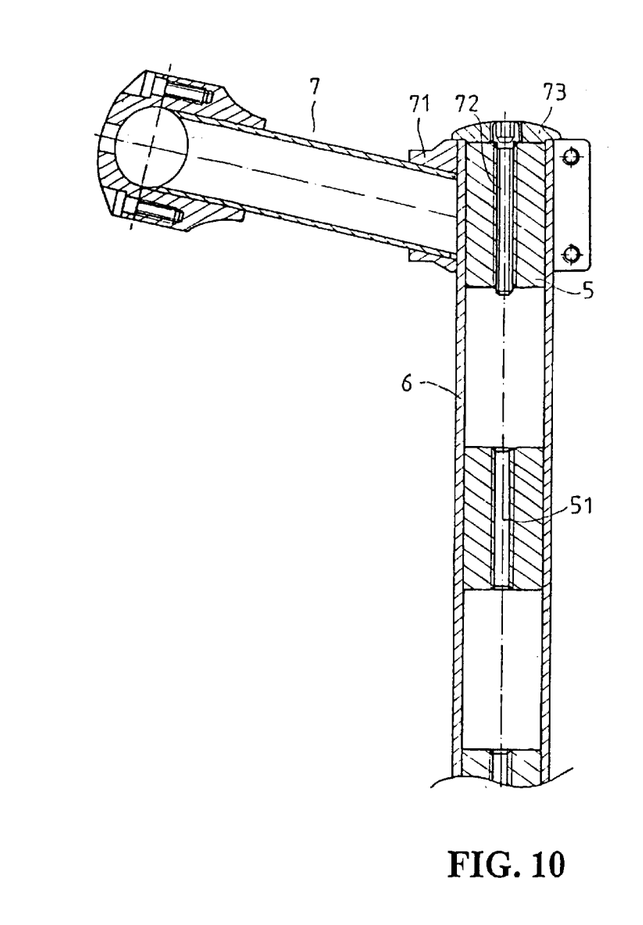
FIG. 10 is a schematic view showing an application of another preferred embodiment of the present invention.
Figure 11:
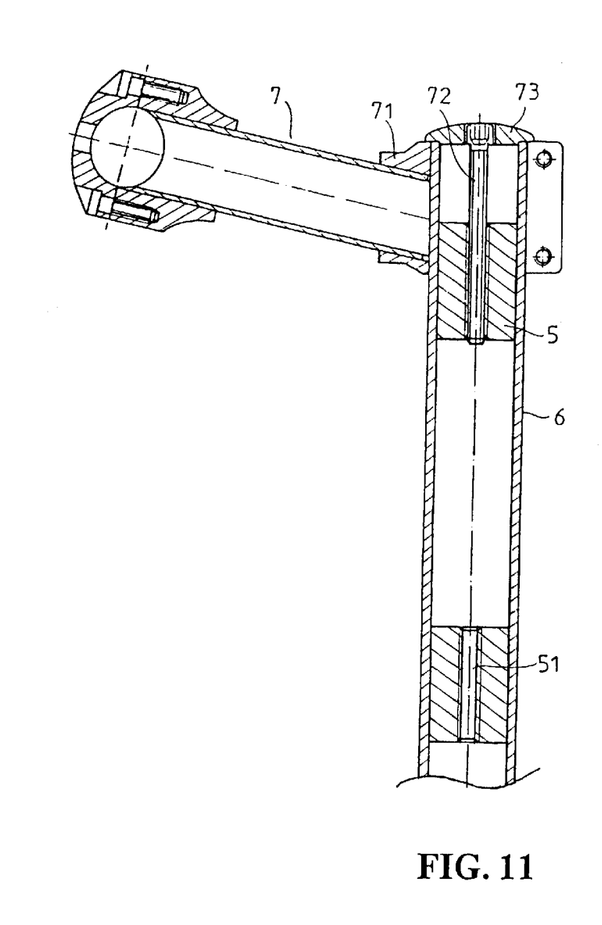
FIG. 11 is a schematic view showing an application of another preferred embodiment of the present invention.

As shown in FIG. 10, the length of the connection block 5 is not the entire length of the head tube 6, but of a shorter length In the head tube 6, a plurality of connection blocks 5 can be adhered therein. The securing element 72 is mounted to the screw hole 51 of the connection block 5 after it has passed trough the pad 73. As shown in FIG. 11, a longer securing element 72 can be used to pass through the pad 73 and an effective mounting is also obtained. Similarly, the connection block 5 is in the form of block, which can be used as a reinforcing rib of the head tube 7 to increase the strength of the head tube 6. Thus, a sufficient strength is obtained to withstand the vibration force exerted to the bicycle while riding on a bumpy road.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a connection structure for a head tube and a handle securing rod of a bicycle, the improvement comprising a connection block secured within the head tube, the center of the connection block being provided with a screw hole, and the head tube being mounted to a connection ring tube of the handle securing rod for the mounting of a securing element to the screw hole of the connection block, and the head tube and the handle securing rod being joined to form as a unit, two lateral sides of the connection block being provided with a corresponding outer protruded circular arc, and the other two lateral sides being provided with corresponding recessed circular arc.

* * * * *